United States Patent [19]

Fenwick

[11] Patent Number: 4,598,921

[45] Date of Patent: Jul. 8, 1986

[54] WHEELCHAIR

[75] Inventor: Robert Fenwick, Guildford, England

[73] Assignee: Lieuse Technology Limited, London, England

[21] Appl. No.: 670,190

[22] Filed: Nov. 13, 1984

[30] Foreign Application Priority Data

Nov. 14, 1983 [GB] United Kingdom ................. 8330289

[51] Int. Cl.[4] ................................................ B62M 1/14

[52] U.S. Cl. ............................ 280/242 WC; 180/907; 280/648; 280/657; 297/DIG. 4

[58] Field of Search ............... 280/242 WC, 289 WC, 280/220, 244, 647, 648, 649, 650, 657, 658, 43, 47.21, 293, 226 R, 47.19, 47.2; 297/DIG. 4; 180/DIG. 907, 65

[56] References Cited

U.S. PATENT DOCUMENTS

| | | | |
|---|---|---|---|
| 3,865,427 | 2/1975 | Delany | 297/DIG. 4 |
| 3,917,312 | 11/1975 | Rodaway | 280/242 WC |
| 4,199,036 | 4/1980 | Wereb | 280/242 WC |
| 4,360,213 | 11/1982 | Rudwick | 280/242 WC |
| 4,380,343 | 4/1983 | Lovell | 280/242 WC |
| 4,506,900 | 3/1985 | Korosue | 280/242 WC |

FOREIGN PATENT DOCUMENTS

| | | |
|---|---|---|
| 3038249 | 5/1982 | Fed. Rep. of Germany . |
| 957309 | 5/1964 | United Kingdom . |
| 1163263 | 9/1969 | United Kingdom . |
| 1442805 | 7/1976 | United Kingdom . |
| 2040237 | 8/1980 | United Kingdom . |
| 2061197 | 5/1981 | United Kingdom . |
| 1595570 | 8/1981 | United Kingdom . |
| 1595702 | 8/1981 | United Kingdom . |
| 2090564 | 7/1982 | United Kingdom . |
| 2101540 | 1/1983 | United Kingdom . |

*Primary Examiner*—John J. Love
*Assistant Examiner*—Everett G. Diederiks, Jr.
*Attorney, Agent, or Firm*—Fleit, Jacobson, Cohn & Price

[57] ABSTRACT

A wheelchair system comprises a substantially rigid seat adapted to be mounted on at least two alternative types of carriages having different drive arrangements each comprising a pair of molded plastic side frames which are interconnected by a bracing mechanism to permit the side frames to be folded together for collapsing the chair or spread apart for erecting the chair. A connecting system including locators which allow the seat to be placed on an approximately fully spread carriage and then to locate the side frames at the correct spacing from one another in order to ensure complete spreading of the carriage, and additionally retainers which allow the seat to be moved into a position in which it cannot be lifted from the thus spread carriage, the retainers allow positive engagement of the seat with the chair with the ability to spread the carriage solely by downward pressure on the seat, thereby enabling a disabled user of the wheelchair to be able to place the seat on the carriage ready for use. A locking assembly prevents the seat from movement so as to disengage the retainers and hence retain the seat and the carriage in engaged configuration.

13 Claims, 10 Drawing Figures

WHEELCHAIR

The present invention relates to a wheelchair.

Conventional wheelchairs have the capacity to be folded flat when not in use, and for this purpose the seat is normally of flexible construction, for example comprising canvas panels extending between folding tubular side frames of the wheelchair. The wheelchair frame is equipped with means for locking the frame erect, usually comprising some form of overcenter linkage.

Although such wheelchairs have the advantage that the seat will readily adapt to various different body sizes and may be made more comfortable by the addition of seat cushions, the fact remains that the seat is not normally sculptured to the anatomy of the human body and thus occupant comfort leaves much to be desired.

Another disadvantage of the conventional wheelchair is that the user of a wheelchair is confined to one particular wheel geometry once he has bought a chair, so that where the user may wish to have the facility of being pushed by an attendant or propel himself or herself by simply grasping the rear wheels of the wheelchair for self-propulsion, and additionally to have the facility of either motorized self-propulsion or level-operated self-propulsion when out-of-doors, various different types of chair need to be bought, each costing quite a considerable sum of money and involving considerable investment by the wheelchair owner.

It is an object of the present invention to enable the drawbacks of conventional wheelchairs to be overcome.

Accordingly, the present invention provides a wheelchair system comprising a carriage, wheels rotatably supported on the carriage, and a substantially rigid seat removably connected to said carriage, characterized by further including an alternative carriage having a different wheel configuration to the first-mentioned carriage, said substantially rigid seat being adapted to be attached alternately to both of the two said carriages.

Preferably the seat is substantially rigid; the carriage is foldable and includes first locating means and first retaining means and the seat includes second locating means and second retaining means; the various said locating means and retaining means are arranged such that engagement of the locating means positions the seat relatively to the carriage and spreads the carriage to a fully erected configuration merely by resting the seat on the carriage; and sliding movement of the seat relative to the carriage brings said first and second retaining means into engagement to maintain the seat on the carriage.

Advantageously, on each side of the carriage in the upper portion thereof is a horizontal bar; said second locating means comprise a downwardly open elongate recess running along each side of the substantially rigid seat of the underside thereof and said first locating means comprise a co-operating upper surface of said bar on which the recess slidably rests; and said second retaining means comprise a bore extending parallel to and positioned as an extension of said recess, at each side of the seat, for enveloping the entire circumference of said bar; said bar upper surface constituting the first locating means and the remainder of the circumference constituting said first retaining means.

In order that the present invention may more readily be understood the following description is given, merely by way of example, with reference to the accompanying drawings in which.

Figure 1:
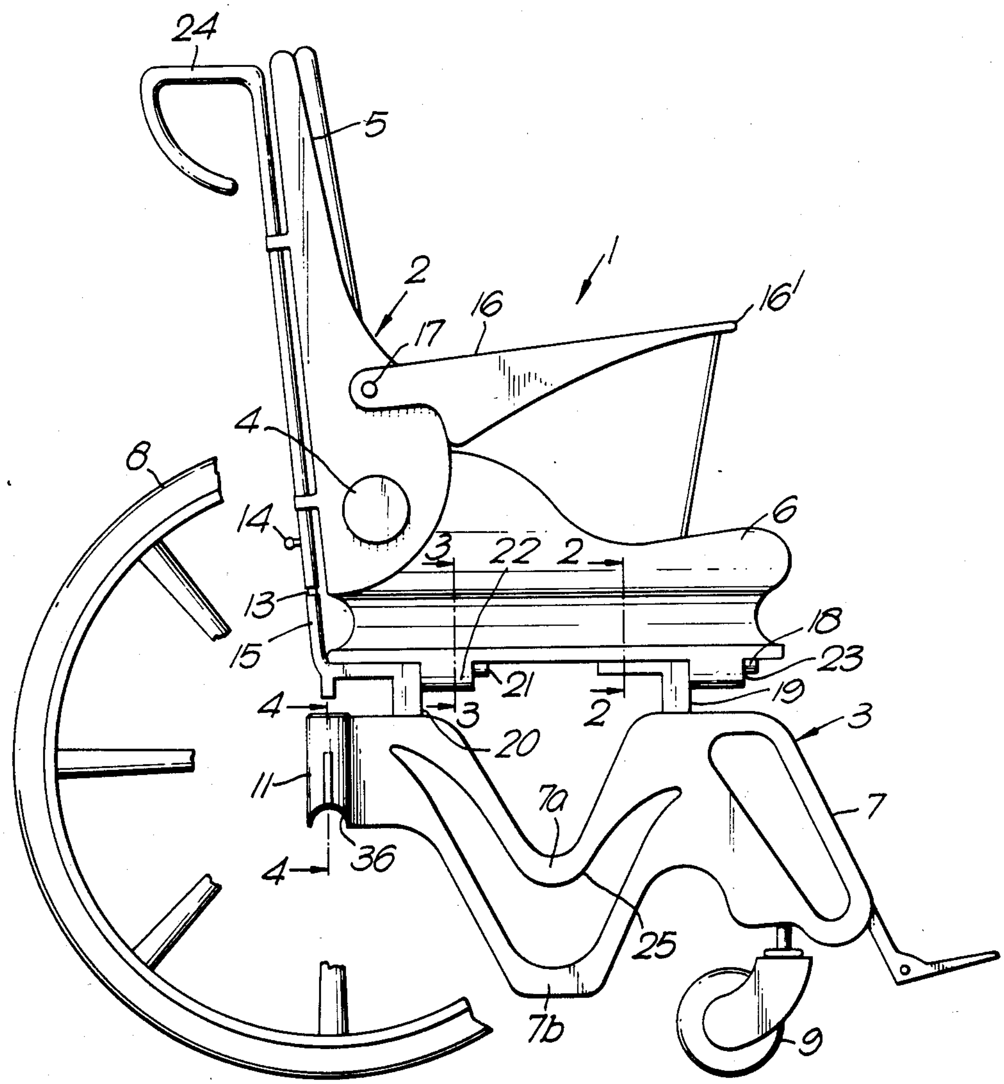
FIG. 1 is a side elevational view of a wheelchair in accordance with the present invention.

FIG. 1 illustrates the wheelchair 1 as comprising a seat 2 and a carriage 3 on which the seat is removably attached. The seat is of molded plastics construction, either injection molded or molded with a fibrous reinforcing structure such as a glass-fiber reinforced plastics composite, and has a hinge 4 connecting the seat back 5 pivotally to the seat base 6.

For removal of the seat 2 from the carriage 3 the seat back 5 is first of all folded flat onto the base 6 and then the flat-folded seat is slid forwardly off the carriage. This enables the seat to be used in another application (for example allowing the seat to be mounted in a vehicle where suitable attachment fittings are provided for the seat, or alternatively enables the one seat to be used with different carriages 3). This versatility of the wheelchair in accordance with the present invention offers considerable advantages in that it enables an economic wheelchair system to be built-up in modular form by buying a single rigid seat 2 which may or may not require special cushions to adapt it to the body of the user, and allowing that one seat to be used with two or more separate carriages one of which may, for example, be motorized and the others may be intended for attendant operation or self-propulsion manually by the occupant of the wheelchair. Thus, instead of having to buy several complete chairs, and find storage space for those chairs, the user of the wheelchair in accordance with the present invention may economize on both cash investment and storage space by a reduction in the number of components which are duplicated between two separate types of wheelchair.

As a further feature of the wheelchair shown in FIG. 1, the same pair of side frames 7 constituting the carriage 3 may be used with different wheel configurations. FIG. 1 shows a large rear wheel 8 and a small castering front wheel 9 on the side frame 7 nearest the observer and there will of course be a second pair of such wheels on the opposite side frame (not shown) behind the plane of the paper. This large wheel 8 is convenient for manual self-propulsion by the user and may, for example, be fitted with a hand-grip rim to allow the user to propel the wheelchair without having to touch the ground-engaging tires of the wheel.

An alternative configuration would be for smaller rear wheels to be used (for example of the type illustrated at 8*a* in FIG. 6), where the wheelchair is to be attendant-manipulated, or for a lever-operated rear wheel configuration (not illustrated in the drawings) to be incorporated. With each of these alternative wheel configurations, it is possible for the same side frames 7 to be used and for the wheel type to be changed simply be removing the wheel carrier 10 (FIG. 5) from the wheel carrier socket 11 of the side frame 3 and then substituting a different wheel carrier having the alternative wheel type attached. The same exchange, by the user or more preferably by a companion, can convert the carriage 3 from a manually propelled carriage to a motorized self-propelled carriage by attaching the motorised wheel carrier 12 of FIG. 7 in place of the wheel carrier 10 of FIG. 5.

FIG. 1 also shows a bolt 13 having an operating handle 14 and engaging in a tubular socket 15 of the side frame 7 to prevent the rigid seat base 6 from sliding forwardly when the seat back 5 is erect. This assists in preventing inadvertent release of the seat 2 from the carriage 3.

An additional aspect of the seat 2, shown in FIG. 1, is the provision of arm rests 16 which are pivoted at 17 to the respective sides of the seat back 5 and are supported at their free ends 16' by means of support stays which are pivotally attached to the seat base 6 and releasably fastenable to the end 16' of the respective arm rest. The arm rests 16 clearly fold parallel to the seat base 6 as the seat back 5 is folded forwardly (after release of the lower end of each stay).

The two carriage side frames 7 are of molded plastics construction, preferably a fiber reinforced plastics composite, and are interconnected one with the other by means of a conventional folding mechanism, not shown in the drawings. Thus, once the seat 2 has been removed from the carriage 3 it is possible for the carriage to be folded flat, preferably after removal of the wheel carriers 10 (FIGS. 5 and 6) from the wheel carrier sockets 11 (FIG. 1) in order to provide a more compact finished folded structure. It is an advantageous characteristic of the wheelchair illustrated in the drawings, that the substantially rigid seat 2 serves as additional bracing means to maintain the side frames 7 at the desired "spread" spacing from each other. This requires the need for relatively straightforward re-assembly of the seat 2 and carriage 3 once the carriage 3 has been erected; the means for achieving this accurate alignment of the various parts of the connection between the side frames 7 and the seat 2 can be appreciated from FIGS. 2 and 3.

Figure 2:
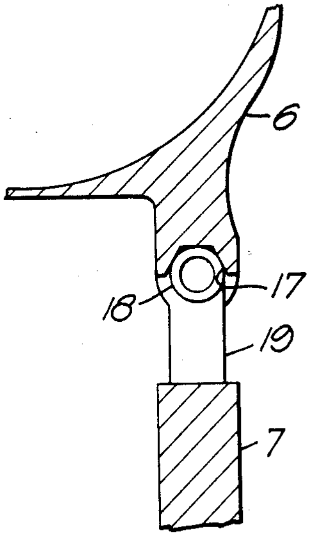
FIG. 2 is a detail section taken on the line 2—2 of FIG. 1 and showing part of the connection between the seat and the carriage.
Figure 3:
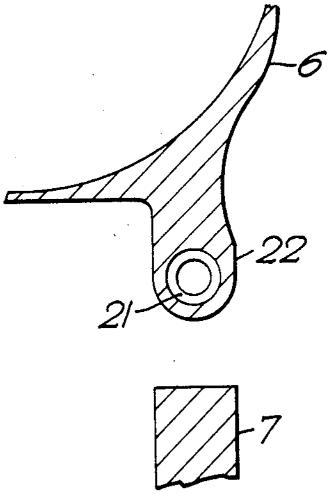
FIG. 3 is a detail section on the line 3—3 of FIG. 2 and showing a further part of the connection between the seat and the carriage.

FIG. 2 shows a detail section taken on the line 2—2 of FIG. 1 and illustrates a front view of a longitudinal recess 17 of inverted, i.e. upwarding tapered, trough-shaped form extending along a portion of the seat base 6. This recess 17 slidably engages a horizontal tube 18 attached to the carriage side frame 7 by way of a bracket 19 which is molded in situ in the carriage side frame 7. This front bracket 19 and guide tube 18 are both shown in FIG. 1.

Further back along the seat 2 is a second such bracket, referenced 20, carrying a guide tube 21 which is integral with the socket 15 for the bolt 13. Like the front bracket 19, the rear bracket 20 is also molded in situ in the side frame 7. The section line 3—3 of FIG. 1 passes through a lug 22 of the seat base 6 which, instead of exhibiting the downwardly open longitudinal guide recess 17 defines a fully enveloping circular bore to receive the rear horizontal guide tube 21.

In practice, the front and rear brackets 19 and 20 with their respective guide tubes 18 and 21 are very similar and so also are the co-operating parts of the seat base 6 in that not only does the part of the substantially rigid seat base engaging the rear guide tube 21 have a front lug 22, but so also does the front part of the seat base have a similar lug 23 with its fully enveloping bore to receive the front end of the guide tube 18.

It will be appreciated from the above that the configuration of the two guide tubes 18 and 21 on their respective brackets 19 and 20 gives them a T-shaped configuration with the guide tubes serving as the cross-bar of the T in each case, and the brackets serving as the stem of the T.

In order to mount the seat base 6 on the spread carriage 3, it is necessary firstly to place the seat base 6 on the guide tubes 18 and 21 in such a way that only the trough-shaped downwardly open recesses 17 of the front and rear parts of the seat base 6 engage the guide tubes 18 and 21. In other words, the seat will be in a position displaced forwardly from that shown in FIG. 1 and will be resting on the front ends only of the guide tubes 18 and 21. It is then a simple matter to ensure that the degree of spreading of the side frames 7 of the carriage 3 is appropriate to allow the accurate alignment of the two guide tubes 18 and 21 in their respective recesses 17, and it is envisaged that this manipulation may well be within the capability of the wheelchair user provided of course he has some alternative means of bodily support while effecting this operation (assuming he is unable to stand unsupported).

The mere act of pressing downwardly on the seat base 6 will itself help to align the side frames 7 with the respective sides of the seat base, by virtue of the V-shaped tapered configuration of the side walls of the recesses 17.

Once the seat has been thus pressed firmly downwardly against the carriage side frames 7, the seat 2 as a whole is pushed rearwardly so that the front ends of the two guide tubes 18 and 21 enter the bores in the respective lugs 22 and 23 of the seat base 6 and then it will not be possible for the seat to be lifted vertically off the carriage or for the seat to be displaced sideways off the carriage during rough use. However, it is then necessary to lock the seat in this rearward position to hold the lugs 22 and 23 on the guide tubes 18 and 21, by operation of the bolt 13. However, this bolt can only be used once the seat back 5 has been erected and erection of the seat back 5 is therefore the last manipulation before final locking of the seat.

Although not shown in the drawings, it is possible for some means of variable inclination of the seat back 5 to be provided, so as to give the seat some degree of reclining ability.

FIG. 1 shows clearly a handle 24 to facilitate pushing of the wheelchair by a companion or attendant.

FIG. 1 also illustrates quite clearly a central cutaway 25 of each side frame 7 of the carriage 3, thereby allowing the wheelchair to be relatively lightweight construction, particularly bearing in mind the fact that the side frames 7 are manufactured from plastics materials. As shown in FIG. 1, the side frame is of a generally Z-shaped configuration and the profile of the upper and lower parts 7*a* and 7*b* of the molded seat construction at the bend in the Z can be shown from the dotted line outline of these components illustrated in FIG. 4 which is a detail of the seat side frame 7 to show the wheel carrier socket 11.

Figure 4:
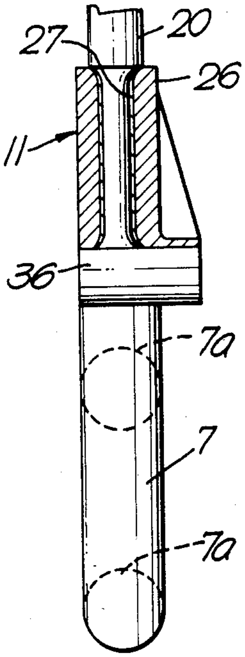
FIG. 4 is a detail section taken on the line 4—4 of FIG. 1 and showing the wheel carrier socket.

As shown in FIG. 4, the molded plastics body of the seat side frame 7 includes a lug 26 defining a vertical cylinder and swaged internally within this lug 26 is a metal liner 27 to allow repeated insertion and withdrawal of a wheel carrier 10 (FIGS. 5 and 6) for the manually propelled wheelchair, or the wheel carrier 12 (FIGS. 7 and 8) of the motorized self-propelled wheelchair, without undue wear of the interior of the socket 11. It is of course important that the wheel carrier be a secure fit in the wheel carrier socket 11, in order to ensure that the chair has the desired degree of accurate steerability over a prolonged useful life of the chair.

Figure 5:
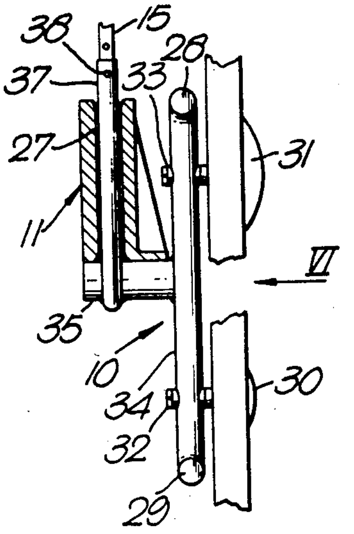
FIG. 5 is a detail seen along the direction of arrow V in FIG. 6 and showing a wheel carrier with two alternative sizes of wheel attached, to illustrate the different positions used for these wheels.
Figure 6:
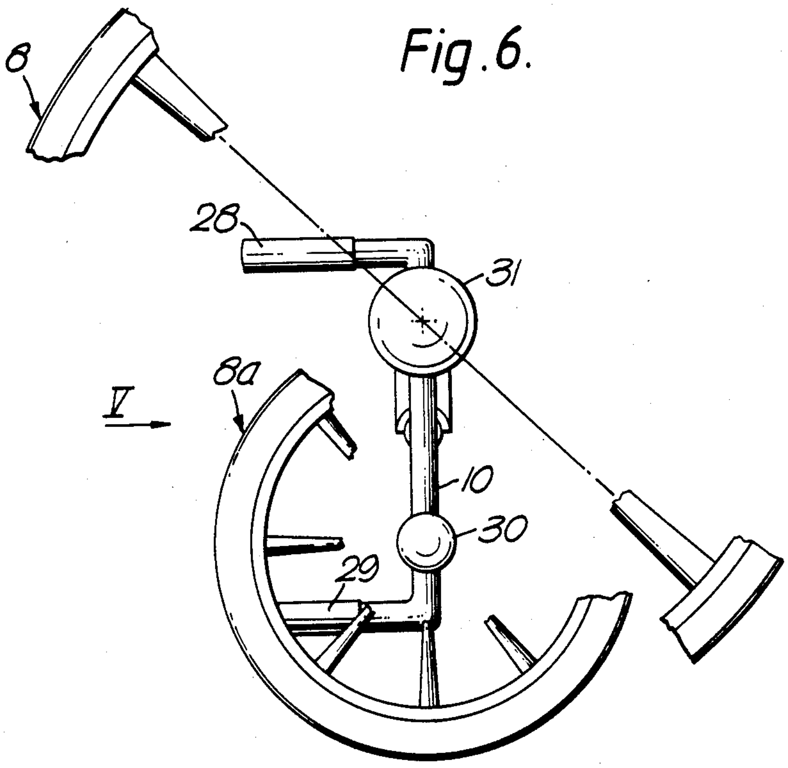
FIG. 6 is a side elevational detail of the wheel carrier of FIG. 5, again showing the two different wheels attached.

Turning now to FIGS. 5 and 6, there will be seen the structure of the wheel carrier 10 and from this it can be seen that the same U-shaped carrier 10, having upper and lower hand grips 28 and 29, respectively can be provided with a lower hub 30 for the smaller diameter wheel 8*a* shown in FIG. 6, or a higher hub 31 for the larger diameter wheel 8 shown in FIG. 6. For this purpose, the U-shaped wheel carrier 10 will be manufactured with two separate mounting bolt sockets 32 and 33 (FIG. 5) to receive the lower and upper hubs 30 and 31, respectively. It is envisaged that a specialist will be responsible for securing the appropriate wheel type 8 or 8*a* to the wheel carrier 10 and that this would not normally be a task undertaken by the wheelchair user, or the attendant or companion, because of the importance of achieving positive mounting of the wheel hub 30 or 31 on the wheel carrier to ensure absolute safety of the wheelchair occupant at all times. However, the mere fact that a single wheel carrier 10 can take the two different kinds of wheels will simplify the stock control of a wheelchair supplier because with a reduced number of wheels, covering the two different sizes of wheel shown in FIG. 6, he needs only to carry a limited number of the U-shaped wheel carriers 10 to make it possible to supply customers with finished wheel carriers equipped with either wheel size.

At the mid-point of the vertical bridge 34 serving as wheel support bar of the U-shaped wheel carrier 10 is a horizontally extending cylindrical bar 35 which is welded to the wheel support bar 34 and which is intended to be snugly received in a hemi-cylindrical recess 36 (FIGS. 1 and 4) of the seat side frame 7. This provides a first location of the wheel carrier 10 and serves to prevent "wheel wobble".

The hand grips 28 and 29 at either end of the vertical wheel support bar 34 enable the person engaging the wheel carrier 10 with the carriage 3 to grip the wheel carrier securely when locating the wheel carrier stem 37 in the socket 11 and when withdrawing the stem 37 from the socket 11. Thus the one hand grip 28 is used when the wheelchair is being assembled and the other hand grip 29 is used when the wheelchair is being dismantled.

It is an advantageous feature of the present invention that the location of the cylindrical bar 35 connecting the wheel support bar 34 with the stem portion 37 is midway between the mountings 32 and 33 for the two different wheels 8*a* and 8, thereby minimizing any effects of instability caused by lack of co-axial relationship between the axis of rotation of the wheel hub 30 or 31 and the axis of the cylindrical bar 35.

Naturally, further steadying of the wheel is required and this is achieved by way of the vertical stem 37 of the wheel carrier, rigidly secured to the cylindrical bar 35. This stem 37 engages snugly in the swaged liner 27 of the wheel carrier socket 11 and completes the accurate location of the wheel carrier 10 in relation to the carriage side frame 7.

At its upper end, the stem 37 has a ball catch 38 which will prevent accidental dropping of the wheel carrier 10 out of the socket 11 in the event of the weight of the wheelchair being taken by the attendant or companion, for example when negotiating stairways. It is considered a very important aspect of the wheelchair that the wheel carrier 10 is simply a plug-in fit in the socket 11 of the carriage but it must of course be ensured that accidental disconnection of this wheel carrier 10 from the side frame 7 cannot occur in use of the wheelchair. Thus the strength of the ball catch 38 is required to be just sufficient to prevent the wheel carrier 10 from dropping out of the socket 11 under its own weight (given some degree of frictional engagement between the stem 37 and the liner 27) and should not be so stiff that a partially handicapped wheelchair user would not be able to remove that wheel from the carriage 3 for collapsing of the carriage when desired.

FIG. 5 also shows that the bottom end of the socket 15 for the bolt 13 (FIG. 1) may engage the top end of the stem 37 for further steadying of the wheel and wheel carrier.

As indicated above, the same wheelchair carriage 3 can, if desired, be equipped with self-propulsion units. One of these could have a lever-operated self-propulsion unit incorporated on a wheel carrier not too dissimilar from that illustrated at 10 in FIGS. 5 and 6. However, another possible variation would be for two of the wheel carriers 12 of FIG. 8 to be attached, one at each side of the carriage 3, and for an appropriate wheelchair control unit to be mounted in one of the arm rests 16 of the seat. Bearing in mind that each of the wheel carriers 12 is provided with its own electric motor 39, it is desirable for the interengagement of the wheel carrier 12 with the side frame 3 to include provision (not shown) for plug and socket connection of control leads for the motor 39. This could, for example, be incorporated on or in association with the cylindrical body 40 which serves the same purpose as the bar 35 of the wheel carrier 10 of FIGS. 5 and 6 and engages in the recess 36 of the side frame 7. Similarly, a further plug-in-connection system will be desirable at the interconnection of the seat 2 with the carriage 3 so that where the control unit for the motorized wheel carriers 12 is already installed in one of the seat arm rests 16, the connection of the leads from that control unit to the leads of the seat side frame can be ensured as the seat is attached to the carriage 3. These various plug-and-socket connectors at each location may, for example, be an integral part of the three components, namely the wheel carrier 12, the side frame 7, and the seat base 6, so that no separate electrical connection is required. Alternatively, it may be possible for a "loose lead" connector to be provided on the seat base 6 on the one hand and on the wheel carrier 12 on the other hand so that one plug-in connection is made at each side of the seat once the seat and the wheel carriers have been connected to the carriage side frames 7.

It is envisaged that the motorized wheel carriers 12 will provide adequate controlability of the wheelchair 1 given the castering ability of the front wheels and the possibility of accurate independent control of the respective righthand and lefthand motors 39 on the righthand and lefthand wheel carriers 12.

Figure 7:
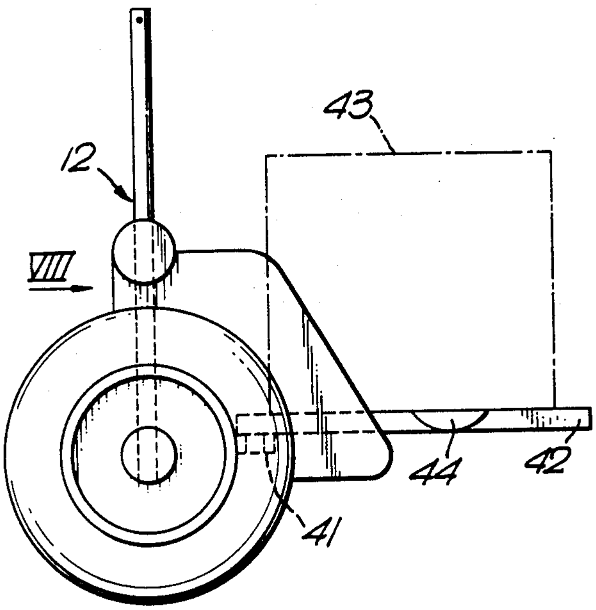
FIG. 7 is a side elevational view of a wheel carrier for a powered wheelchair.
Figure 8:
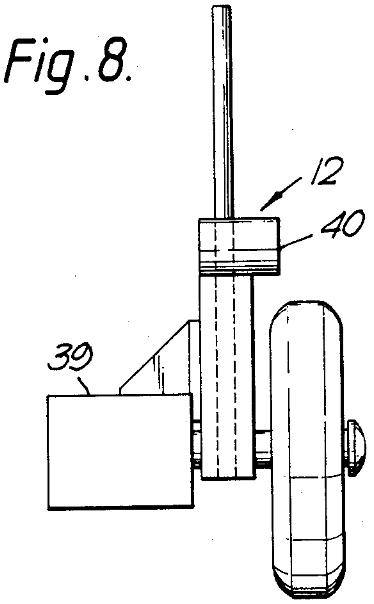
FIG. 8 is a rear elevational view, looking along the line of arrow VIII of FIG. 7, showing the wheel carrier of FIG. 7.

As shown in FIG. 7, the motorized wheel carrier 12 also includes an attachment 41 for a battery support plate 42 to mount an electric storage cell 43 in a housing in the space between the two side frames 7 of the carriage 3. For this purpose, each side of the support plate 42 additionally includes a part-cylindrical boss 44 forwardly of the wheel carrier 12, and adapted to rest in the part-cylindrical cradle formed by the upper portion *7a* (FIG. 1) of the carriage side frame 7.

It will be clear from the above that the conversion of a carriage 3 from manually-propelled to motorized type is a more time consuming and involved process than the simple conversion of the carriage 3 from attendant-manipulated form (using the wheels 8*a* of FIG. 6) to manually self-propelled form (using the wheels 8 of FIGS. 1 and 6) and it is therefore envisaged that once a carriage 3 has been converted to self-propelled motorized format it will not normally be regularly converted back to manual propulsion. However, it does not require a lot of technical skill to make such a conversion either way and this therefore brings the modification of the chair from manual to motorized format and vice versa within the realms of the skill of the average do-it-yourself expert.

From the above it will be understood that the wheelchair described and illustrated herein does not merely constitute a very complex system of exchangeable parts which, when purchased by the user, can enable him to convert his chair between attendant-propulsion, motorized self-propulsion, simple hand wheel self-propulsion, and lever-operated self-propulsion, but additionally enables a wheelchair user to start off with the basic wheelchair illustrated in FIG. 1, possibly with the smaller diameter wheel 8*a* of FIG. 6, and then to expand the capabilities of his wheelchair by buying "bolt-on" conversion accessories as his financial resources improve or as his degree of dependence on the chair increases. Thus, starting from the simple configuration shown in FIG. 1, the user may well finish up with one seat 2 and a pair of carriages 3, one of which is permanently fitted with motorized wheel carriers 12 and the other of which can accommodate two alternative sets of wheel carriers 10, one with the self-propulsion large wheels 8, and the other with the attendant-propulsion small wheels 8*a* which offer the advantage of making the folded chair much more compact, for example in order to allow the wheelchair carriage to be folded into the trunk space of even the smallest saloon automobile.

Figure 9:
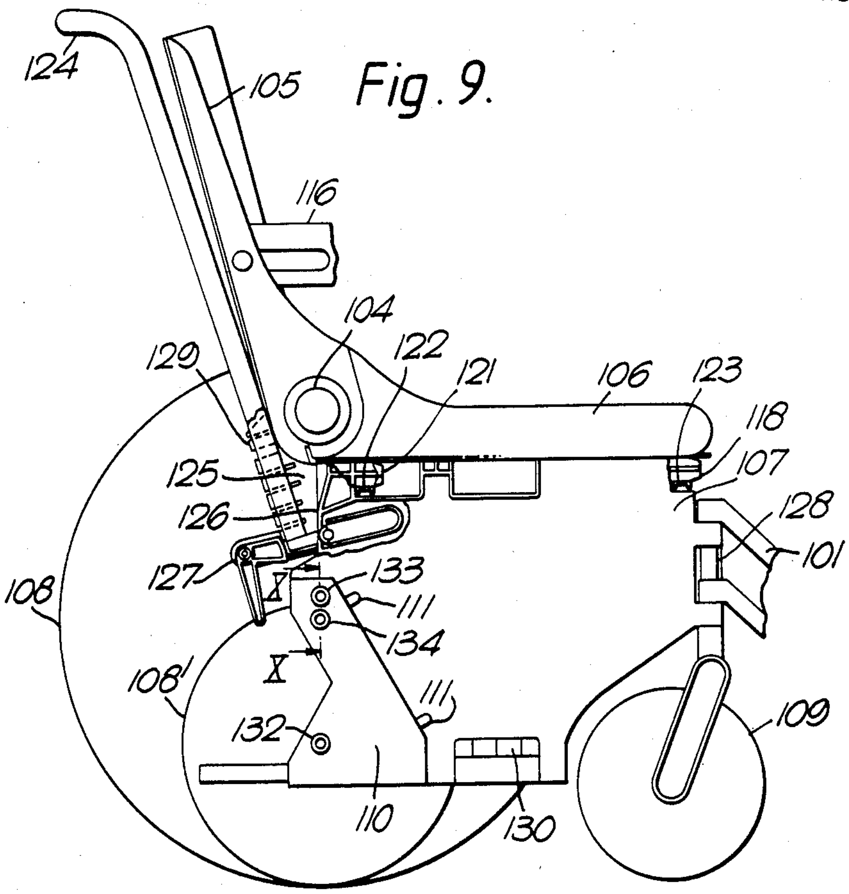
FIG. 9 is a side elevation of an alternative embodiment of wheelchair.

FIG. 9 shows an alternative embodiment of the chair, embodying the principles illustrated in FIGS. 1 to 8, and described above, and incorporates additional improvements which will be described below.

The overall shape of the side frames 107 in FIG. 9 is considerably different from that of side frames 7 of FIG. 1, although the same method of fixing the seat base 106 to the side frames 107 has been retained, namely the use of a pair of forwardly projecting pegs 118 and 121 of the side frame, engaging sleeves 122 and 123 of the seat base, with a V-section guide groove (not shown in FIG. 9) behind each of the sleeves 122 and 123 to ensure that as the seat base 106 is pressed down on to the completely or almost completely spread carriage structure before the seat is pushed back towards the pegs 118 and 121, the camming action between the V-shaped grooves of the seat base 106 and the pegs 118 and 121 of the side frames serves to ensure that the carriage side frames are completely spread apart ready for the seat base 106 to be pushed rearwardly to anchor it safely on the pegs 118 and 121.

However, this embodiment is different from that of FIG. 1 in that the sleeves 122 and 123 can be a friction fit on the respective pegs 121 and 118, and the final rearward movement of the seat base 106 relative to the side frames 107 is actuated by pivoting the seat back 105 into the upright configuration (automatically raising the arm rests 116, in so doing) thus causing a downwardly projecting end portion 125 of the seat back to engage cammingly against a surface 126 of the back of the side frame and as a result a levering action is applied (bearing in mind the position of the fulcrum 104 between the seat back 105 and the seat base 106) which pulls the seat base 106 slightly further rearwardly into its fully home position.

As the seat base 106 comes into its FIG. 9 or "fully home" position, a locking toggle 127 on each of the side frames catches the rear of the projection 125 to hold the seat back 105 upright.

Quite clearly, in view of the camming engagement between the projecton 125 and the surface 126 of each side frame, release of the locking toggles 127 is necessary before the seat back 105 can be folded forwardly to permit the seat base 106 to move forwardly for subsequent removal. Thus, the entire chair is held as a rigid structure until such time as the locking toggles 127 have been deliberately released and the seat back 105 has been folded down to the seat base 106.

As shown in FIG. 9, the foot rests are mounted on swinging supports 101 pivoted on the support shaft 128 for the front castering wheels 109. This pivoting action of each foot rest support 101 allows it to be folded backwardly into contact with the side frame 107, to render the wheelchair more compact.

The wheelchair shown in FIG. 9 has both the large diameter 22 inch (56 cm) wheels 108 illustrated, and also the alternative smaller diameter rearwheels 108'. To receive these wheels, each removable wheel carrier 110 has two alternative wheel spindle bearing recesses, 132 for the smaller wheels 108' and 133 for the larger wheels 108. An additional wheel spindle bearing recess 134 is provided for yet a third form of wheel, if desired.

As in the case of the wheel carriers 10 of the FIG. 1 embodiment, the wheel carriers 110 are formed separately from the main side frame members 107 and are in this case bolted in place thanks to tabs 111 of the wheel carriers 110, and bolts (not shown) which pass through the tabs 111 and co-operating lugs of the side frames 107.

Figure 10:
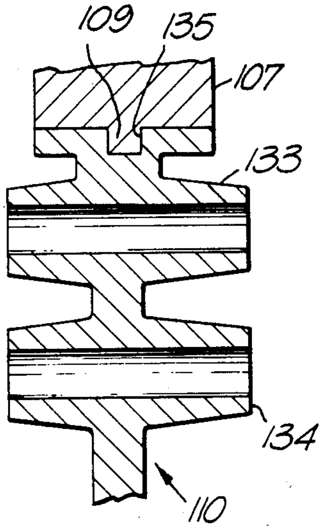
FIG. 10 is a detail section on the line X—X of FIG. 9.

To help to keep the entire assembly of wheel carriers 110 and side frames 107 rigid, the cross-section of the wheel carrier 110 is, as illustrated in FIG. 10, formed with an upwardly open groove 135 which extends along the top of the wheel carrier 110 and down the entire inclined front edge of the wheel carrier 110, and which receives a corresponding bead 109 of the side frame 107. Thus, even before fastening the bolts through the tabs 111 and the corresponding lugs of the side frames 107, the assembly of the wheel carriers 110 and the side frames 107 is already a firm friction fit thanks to the interengagement of the bead 109 with the groove 135. This structure provides the same degree of wobble prevention which is exhibited by the engagement of the wheel carriers 10 in the side frames 7 in the FIG. 1 embodiment.

The wheelchair is completed by the addition of a one piece handle 124 which fits in cylindrical sockets 129 of the seat back 105, and furthermore by a pair of cross braces 130 which constitute a scissor-action folding mechanism to the chair.

Although, in FIG. 10, the wheel carrier 110 is shown as having a recess 135 to receive the rib 109, it is of course possible for each of the wheel carriers 110 to be provided with a projection, analogous to the rib 109, to engage in a corresponding recess, analogous to the groove 135, in the side frame 107.

I claim:

1. In a wheelchair comprising a foldable carriage, wheels rotatably supported on the carriage, and a substantially rigid seat removably connected to said carriage, the improvement wherein:

(a) the carriage includes left and right side frames, collapsible bracing means between said left and right side frames for permitting movement of said left and right side frames towards and away from one another to a collapsed condition and an erected condition, respectively, and first locating means and first retaining means on each said side frame;

(b) the substantially rigid seat includes left and right second locating means and left and right second retaining means; and (c) wherein the left and right locating means of at least one of the substantially rigid seat and the carriage has a shape which tapers when viewed from the front to permit self-centering camming engagement of the locating means of the seat and the carriage; the various said first and second locating means and first and second retaining means being arranged such that engagement of the respective left and right first and second locating means positions the substantially rigid seat relatively to the carriage and spreads the carriage side frames to a fully erected configuration merely by placing the substantially rigid seat on top of the carriage, and that sliding movement of the seat relative to the carriage brings said left and right first and second retaining means into engagement to maintain the substantially rigid seat on the carriage.

2. A wheelchair comprising a foldable carriage, wheels rotatably supported on the carriage, and a substantially rigid seat removably connected to said carriage, wherein the carriage includes left and right horizontal bars at the sides of the carriage in the upper portion thereof; wherein said substantially rigid seat includes left and right downwardly open elongate recesses running along the respective sides of the substantially rigid seat on the underside thereof, and means defining respective left and right bores extending parallel to and positioned as an extension of each said elongate recess at each side of the seat, said left and right bores being adapted to envelop the entire circumference of said left and right bars of the carriage; and wherein each of said left and right bars includes an upper surface cooperating with the left and right downwardly open elongate recesses of the substantially rigid seat, said bars, recesses and bores being positioned to ensure spreading of the carriage to a fully erected configuration by cammingly engaging the left and right recesses of the seat on the left and right bars of the carriage, and to ensure retention of the substantially rigid seat and the carriage in engagement by sliding movement of the seat relative to the carriage to engage said left and right bars of the carriage in said left and right bores of the substantially rigid seat.

3. A wheelchair according to claim 2, wherein there are forward and rearward said bars on each side of the carriage and respective forward and rearward said downwardly open recesses and bore defining means on each side of the seat for engagement with said forward and rearward bars.

4. A wheelchair according to claim 4, wherein each said forward bar is co-axial with a said rearward bar and each said forward bore is co-axial with a said rearward bore.

5. A wheelchair according to claim 2, including means for locking the substantially rigid seat relative to the carriage to prevent sliding movement of the seat in a direction to disengage the said first and second retaining means.

6. A wheelchair according to claim 2, wherein said substantially rigid seat includes a substantially rigid seat base, a seat back and means mounting said seat back foldably relative to said seat base to bring the seat back and the seat base into substantially parallel relationship.

7. A wheelchair according to claim 2, wherein the carriage is formed of two side frames each adapted to be equipped with a front wheel and a rear wheel; and wheel carriers each supporting one of said wheels on each of the carriage side frames; and releasable means engaging said wheel carriers with the respective said carriage side frame for allowing releasable attachment of each said one wheel to a respective carriage side panel, said releasably engageable means being effective to prevent both play of the wheel carrier relative to the side frame in the sense of pivoting around a vertical axis and play of the wheel carrier relative to the side frame in the sense of pivoting around a horizontal axis longitudinal to the side frame; wherein said releasable engaging means comprise on the one hand a projection formed on one of the wheel carrier and the side frame and, on the other hand, a recess formed on the other of the wheel carrier and the side frame for receiving the said projection as a tight fit.

8. A wheelchair according to claim 7, wherein each said wheel carrier includes means for fastening a rotatable wheel to said wheel carrier at different locations thereon for receiving respective alternative wheels of different diameters.

9. A wheelchair according to claim 2, wherein said carriage includes rear wheels having a circular hand grip for self-propulsion by the wheelchair occupant.

10. A wheelchair according to claim 2, wherein said carriage includes righthand and lefthand drive motors driving the righthand and lefthand rear wheels, respectively; a power source for the drive motors; and control means for providing differential speed control of the two motors.

11. A wheelchair comprising a foldable carriage, front wheel means, left hand and right hand rear wheels rotatably supported on the carriage, and a substantially rigid seat removably connected to said carriage, wherein the carriage includes first locating means and first retaining means; wherein the substantially rigid seat includes second locating means and second retaining means; and wherein the various said locating means and retaining means are arranged such that camming engagement of the first and second locating means positions the seat relatively to the foldable carriage and spreads the carriage to a fully erected configuration merely by placing the seat on top of the carriage, and that sliding movement of the seat in a first direction relative to the carriage brings said first and second retaining means into engagement to maintain the substantially rigid seat on the foldable carriage, and further including means for locking the substantially rigid seat relative to the foldable carriage to prevent sliding movement of the seat in a second direction opposite to said first direction thereby to prevent disengagement of said first and second retaining means, and wherein said locking means locks the seat back against folding relative to the seat base, and the seat back is adapted to hold the seat base relative to the carriage until the holding means have been operated to release the seat back for forward movement to permit the seat base to move in the removal direction.

12. A wheelchair according to claim 11, wherein said left hand and right hand rear wheels include a circular hand grip for self-propulsion by the wheelchair occupant.

13. A wheelchair according to claim 11, wherein said carriage includes right hand and left hand drive motors driving the right hand and left hand rear wheels, respectively; a power source for the drive motors; and control means for providing differential speed control of the two motors.

* * * * *